March 17, 1925.

H. R. LONTZ 1,530,086

SLEEVE BEARING

Filed Nov. 3, 1922

Inventor

Harry R. Lontz

By Mauro, Cameron, Lewis & Kerkam

Attorneys

Patented Mar. 17, 1925.

1,530,086

UNITED STATES PATENT OFFICE.

HARRY R. LONTZ, OF RICHMOND, INDIANA.

SLEEVE BEARING.

Application filed November 3, 1922. Serial No. 598,916.

*To all whom it may concern:*

Be it known that I, HARRY R. LONTZ, a citizen of the United States of America, and a resident of Richmond, Indiana, have invented new and useful Improvements in Sleeve Bearings, which invention is fully set forth in the following specification.

This invention is an improvement in bearings, such as disclosed in U. S. Patents No. 1,298,980, dated April 1, 1919, and No. 1,031,417, dated July 2, 1912.

It has heretofore been proposed to provide bearings, of the general character illustrated in the aforesaid patents, with a bearing sleeve which, under the influence of a spring, will coact with the bearing members to take up any slack between the same but which will grip the shaft or other supporting member, when a proper bearing pressure has been obtained, to prevent the force of the spring from being exerted on the bearing itself. Resilient bearing sleeves of this type must be made to proper size within close limits; they must possess sufficient flexibility to grip the shaft properly without exerting undue pressure on the bearing parts; and they must be strong and durable so as to withstand the more or less rough usage to which lawn mowers are incident. To afford the proper flexibility it was considered necessary to make the bearing sleeves of relatively soft metal, and to provide sufficient strength without undue quantity or weight of metal it was proposed to form such bearing sleeves of die-castings thickened at the ends of the conic frustum and having relatively thin walls intermediate the thickened portions. Experience demonstrated, however, that while die-casting such bearing sleeves from relatively soft metal afforded a simple and convenient manner of manufacture, the sleeves so made were not entirely satisfactory for various reasons, among which was the tendency of the sleeve to bulge and grip the conical surface of the coacting bearing member instead of gripping the shaft as intended. To avoid these difficulties and obtain a sleeve that would be both flexible and strong and durable, it has been proposed to stamp the same from sheet metal. This manner of manufacture is more costly, however, because a sleeve of the requisite flexibility and strength can only be formed by a number of successive blanking, bending and forming operations, whereby it is highly desirable that die-castings be employed if possible.

I have discovered that bearing sleeves of this character can be produced which possess the requisite flexibility, which are sufficiently strong and durable without an undue weight of metal therein, and which can be formed from die castings, while avoiding the difficulties respecting the sticking of the sleeve in the cooperating bearing member, by forming the sleeve of relatively hard metal and machining a channel in the outer surface of the sleeve intermediate the extremities of the conic frustum. The relatively hard character of the metal affords the proper resiliency (owing to the slots machined into the same as heretofore employed) and at the same time the necessary strength without the necessity of thickening the walls at the extremities of the frustum, while the air pocket entirely eliminates the tendency of the sleeve to bulge and grip its cooperating bearing member—whereby the sleeve can perform its designed function properly.

The invention will be better understood by reference to the accompanying drawing in which—

Figure 1:
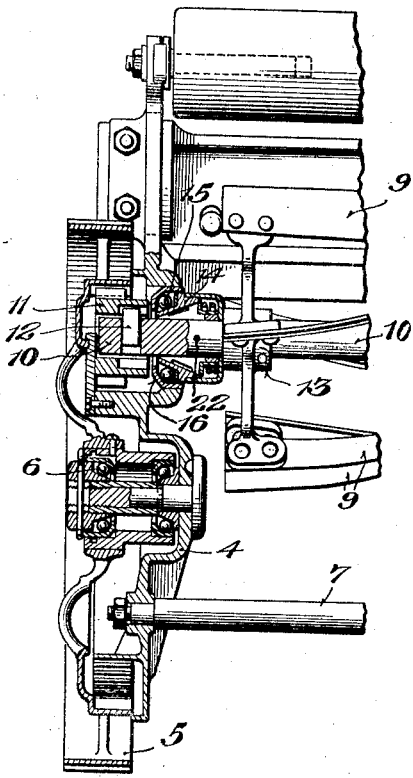
Fig. 1 is a partial plan view of a lawn mower, some of the parts being broken away for purposes of clear illustration.
Figure 2:
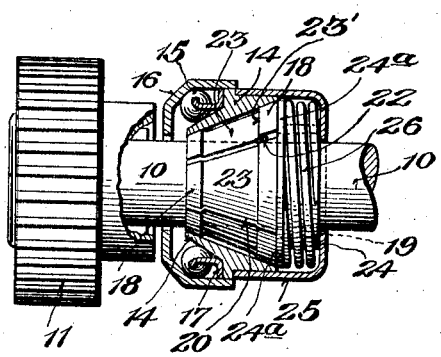
Fig. 2 is a side view of the bearing, partly in section.
Figure 4:
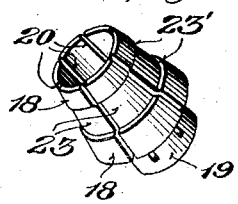
Fig. 4 is a detail perspective view of the split or collapsible sleeve.
Figure 3:
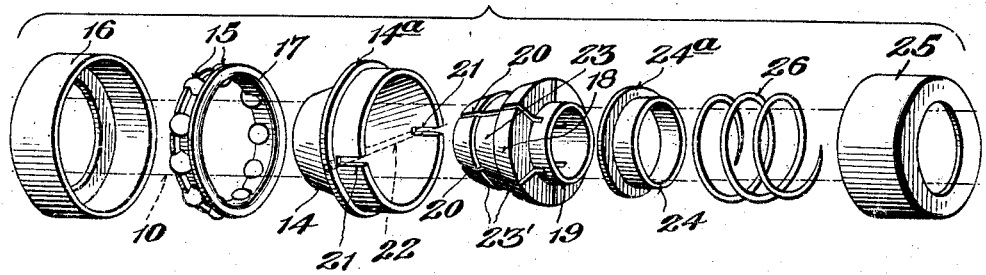
Fig. 3 is a view showing the several parts of the bearing pulled out or extended one from another.

Referring to the drawings, 4 represents one of the side frames of the machine, the same being mounted on a suitable ground wheel 5 by means of a bearing shown at 6. 7 is a rod connecting the side frame with the opposite side frame (not shown) and 8 is the usual ground roller.

The shaft for the rotary cutter blades 9—9 is indicated at 10. One end of this shaft is mounted in the side frame shown and carries a pinion 11 which meshes with an internal annular gear carried by the ground wheel 5. In a recess at the end of shaft 10 is mounted a pawl 12 adapted to engage suitable teeth formed on the interior of the hub of pinion 11. The pawl 12 by engaging the pinion serves to turn the shaft 10 in one direction, but not in the other. Since the construction above described is identical on both sides of the machine, only one side of the same has been illustrated and described. The blades of the rotary cutter are suitably secured to hub 13 which is fixed to shaft 10 in any desired manner.

Surrounding shaft 10 at the end thereof is a bearing member 14, this member preferably constituting the inner raceway of a ball bearing. The raceway 14 is engaged by balls 15 which also engage a raceway 16 carried by the frame 4. The balls are separated and controlled by means of a cage 17. The interior aperture of the bearing member 14 is conical, its walls converging toward the outside of the machine.

The sleeve of the present invention is indicated at 18 and comprises a collapsible body having an inner cylindrical surface adapted to engage the surface of shaft 10, and an outer conical surface adapted to engage the inner conical surface of bearing member 14. The sleeve 18 is provided with a continuous hub or collar 19 which closely fits the shaft, and the main body portion of the sleeve is provided with slots 20 which preferably extend the entire length thereof and for a short distance into the collar 19. The bearing member 14 is provided with oppositely disposed notches 21—21 adapted to register, when the parts are assembled, with two of the slots 20 in the sleeve 18. A pin 22 extends through the shaft 10 and into said slots 20, thus causing the said sleeve and bearing member to turn with the shaft but leaving them free to move longitudinally thereof.

The sleeve 18 is machined out of a relatively hard metal, for example steel, the slots 20 of the sleeve being formed therein by any suitable metal cutting device. Said sleeve is provided, intermediate the ends of the slots therein, with a circumferential groove 23 formed by cutting a recess, preferably having sharply defined edges 23'. The outer bearing surfaces of said sleeve, extending from the groove or channel 23 to the ends of the sleeve, have a total area greater than the area of said channel, the width of channel 23 being less than the combined width of the outer bearing surfaces bounding said channel and preferably less than one-half the length of the outer frusto-conical surface of the sleeve. The arms formed by slots 20 thus have outer bearing surfaces extending over more than one-half of the length of said arms, the total area of these surfaces being greater than the area of channel 23. The said sleeve is rendered flexible because of the slots formed therein and is adapted to firmly grip the shaft 10 upon the application of a slight inward pressure through the outer surface. Closely fitting the collar 19 is a steel ring or thimble 24. In engagement with the hub 13 is a casing 25 which is formed to extend outward so as to enclose the thimble 24 and parts of the sleeve 18 and the bearing member 14. Preferably, the bearing member 14 is provided with a flange at 14ª with which the edge of the casing cooperates.

Positioned within the casing 25 and interposed between a flange 24ª on the thimble 24 and the inner wall of the casing 25 is a coiled compression spring 26. This spring, acting through the thimble 24 and the sleeve 18, serves to move the bearing member 14 outward into firm engagement with the walls 15, thus keeping the bearing tight and compensating for wear.

The construction of the sleeve 18 is such that it prevents the spring from exerting too great a pressure on the member 14. As previously stated, the sleeve tends to firmly grip the shaft 10 when pressure is applied to its outer surface, and the result is that, as soon as the spring 26 acts, its pressure is applied not only to the member 14 but also by reaction to the outer surface of the sleeve, thus causing the sleeve to grip the shaft and limit further movement. By forming the sleeve with the circumferential groove 23, the air pocket provided thereby effectively prevents any tendency of the sleeve to adhere to the inner surface of the cone and thus insures that the device shall perform its gripping function. By machining the sleeve out of a relatively hard metal, greater flexibility of the same is obtained and at the same time the amount of such metal required is substantially less than necessary to produce the sleeves of the patents above referred to.

While the invention is herein particularly shown and described with respect to any undue binding of the bearing for the shaft of a rotating knife of a lawn mower, it will be understood that the invention is not limited to this use, but that the improved bearing may be used in association with the ground wheels and, indeed, anywhere it is desired to maintain bearing elements in proper engagement.

What is claimed is:—

1. In a bearing of the character described, a flexible, collapsible bearing sleeve formed of relatively hard metal and provided with a circumferentially-extending channel intermediate its ends, to form an air pocket, said sleeve having bearing surfaces extending from said channel to the ends of the sleeve with a total area greater than the area of the channel.

2. In a bearing of the character described, a flexible, collapsible bearing sleeve formed of relatively hard metal and having a frusto-conical surface provided with a circumferentially-extending channel intermediate the extremities of said surface, to form an air pocket, the width of said channel being less than one-half the length of said frusto-conical surface.

3. In a bearing of the character described, a collapsible bearing sleeve formed of relatively hard metal and having a plurality of longitudinally extending slots to form a plurality of flexible arms and a circumferentially-extending channel in the outer surface of said sleeve intermediate the length of said arms, to form an intermediate air pocket, said arms having bearing surfaces at either side of said channel with a total area greater than the area of said channel.

4. In a bearing of the character described, a collapsible bearing sleeve formed of relatively hard metal and having a frusto-conical surface, a plurality of slots in said frusto-conical surface to provide a plurality of flexible arms, and a circumferentially-extending channel in said frusto-conical surface intermediate the length of said arms, to form an intermediate air pocket, said arms having bearing surfaces at both sides of said channel which together extend over more than one-half of the length of said arms.

5. In a bearing of the character described, a collapsible bearing sleeve formed of relatively hard metal and provided with a frusto-conical surface, a collar at the large end of said frusto-conical surface for mounting said sleeve on a shaft, a plurality of slots in said frusto-conical surface to provide a plurality of flexible arms adapted to engage the shaft at the smaller end of the frusto-conical surface, and a circumferentially-extending channel in said frusto-conical surface intermediate the length of said arms to form an intermediate air pocket having a width less than the combined width of the bearing surfaces bounding said channel.

In testimony whereof I have signed this specification.

HARRY R. LONTZ.